United States Patent [19]

Lenkoff

[11] Patent Number: 4,514,177
[45] Date of Patent: Apr. 30, 1985

[54] INVISIBLE INK QUIZ GAME

[75] Inventor: Leon G. Lenkoff, Louisville, Ky.

[73] Assignee: Stry-Lenkoff Co., Louisville, Ky.

[21] Appl. No.: 572,882

[22] Filed: Jan. 23, 1984

[51] Int. Cl.³ .............................. G09B 3/06; A63F 9/18
[52] U.S. Cl. ..................................... 434/328; 273/139;
    273/240; 273/DIG. 26
[58] Field of Search ....................... 434/328, 346, 322;
    273/139, DIG. 26, 302, 240, 138 R, 139, 141 R

[56] References Cited

U.S. PATENT DOCUMENTS

| | | | |
|---|---|---|---|
| 1,866,545 | 7/1932 | Cohen | 434/328 |
| 1,884,197 | 10/1932 | Peterson | 434/328 |
| 2,618,866 | 11/1952 | Adams | 434/328 |
| 3,224,112 | 12/1965 | Hanson | 273/141 R X |
| 3,451,143 | 6/1969 | Thomas et al. | 434/328 |
| 3,516,177 | 6/1970 | Skinner | 434/328 |
| 3,826,499 | 7/1974 | Lenkoff | 434/328 X |
| 3,918,174 | 11/1975 | Miller et al. | 434/346 |
| 4,084,332 | 4/1978 | Waloszyk et al. | 434/328 |

Primary Examiner—William H. Grieb
Attorney, Agent, or Firm—Ralph B. Brick

[57] ABSTRACT

A game device including first and second areas with the first area having a number of visible questions, each having a visible identifying indicia associated therewith and at least two visible answers with invisibly marked designations indicating correctness of the answer of the question responded to and a second defined area having random chance selection means to indicate the question to be responded to by a player.

13 Claims, 4 Drawing Figures

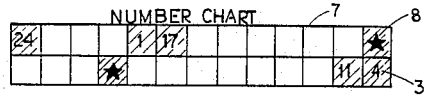

```
NUMBER CHART                    7      8
┌──┬──┬──┬──┬──┬──┬──┬──┐
│24│  │ 1│17│  │  │  │ ★│
├──┼──┼──┼──┼──┼──┼──┼──┤
│  │  │ ★│  │  │  │11│ 4│
└──┴──┴──┴──┴──┴──┴──┴──┘ 3
```

3   2
1. This white material comes from elephant tusks.
   ___YES ivory ___4        ___NO iodine
 G ___NO itinerate          ___NO incense 2. She was Nelson Eddy's sweetheart in several movies.
   ___Jane Fonda            ___Jeanette MacDonald
   ___Liv Ullmann           ___Harriet Nelson 3. The "House that Ruth Built"
   ___Polo Grounds          ___Yankee St.
   ___Ebbets ___in the doghouse       ___behind the dog curtain
                            ___out of dog biscuits
23. New Zealand, Guam, and Samoa are islands in the
    ___Atlantic Ocean       ___Pacific Ocean
    ___Caspian Sea          ___Caribbean Sea 24. Irish poet and dramatist
    ___Alfred Hitchcock     ___John McCormack
    ___Oscar Wilde          ___Robert Burns U.S. Patent  Apr. 30, 1985  4,514,177

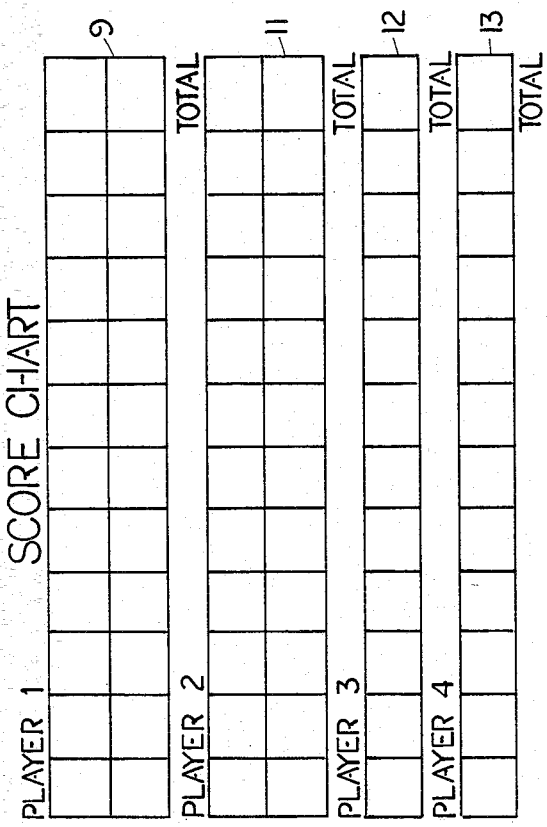

FIG. 3

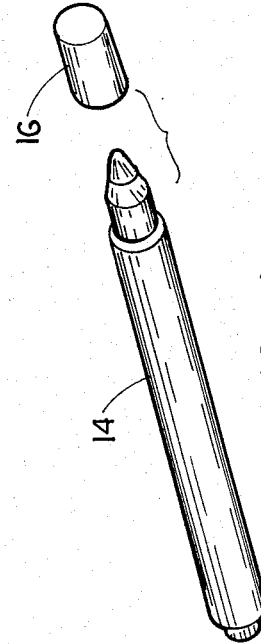

FIG. 4

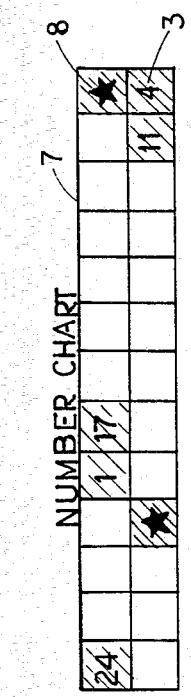

FIG. 1

1. This white material comes from elephant tusks.
   — YES ivory — iodine
   — NO itinerate — NO incense 2. She was Nelson Eddy's sweetheart in several movies.
   — Jane Fonda — Jeanette MacDonald
   — Liv Ullmann — Harriet Nelson 3. The "House that Ruth Built"
   — Polo Grounds — Yankee St
   — Ebbets — in the doghouse — behind the dog curtain
                     — out of dog biscuits 23. New Zealand, Guam, and Samoa are islands in the
    — Atlantic Ocean — Pacific Ocean
    — Caspian Sea — Caribbean Sea 24. Irish poet and dramatist
    — Alfred Hitchcock — John McCormack
    — Oscar Wilde — Robert Burns

INVISIBLE INK QUIZ GAME

BACKGROUND OF THE INVENTION (1) Field of the Invention

The present invention relates to quiz games and more particularly to a unique quiz game which provides for random chance selection of a question or questions to be answered by a player and which utilizes invisible printing ink to arrive at the correctness of the answer of the question or questions responded to by a player.

(2) Brief Description of the Prior Art

As set forth in such long since expired U.S. patents as: U.S. Pat. No. 1,884,197, issued to H. J. Peterson et al on Oct. 25, 1932; U.S. Pat. No. 1,866,545, issued to J. G. Cohen on July 12, 1932; U.S. Pat. No. 2,618,866, issued to C. S. Adams on Nov. 25, 1952; and as set forth in more recent unexpired U.S. patents as: U.S. Pat. No. 3,451,143; issued to R. E. Thomas et al, on June 24, 1969; U.S. Pat. No. 3,516,177, issued to B. F. Skinner on June 23, 1970; U.S. Pat. No. 4,084,332, issued to J. S. Waloszyk et al on Apr. 18, 1978; and U.S. Pat. No. 3,826,499, issued to the present inventor, Leon G. Lenkoff, on July 30, 1974, it has long been known in the printing art and in the game art as well to scribe invisible ink upon a writing surface in a desired manner and to then utilize a suitable color activating means to react with the ink so that the invisible ink scribing becomes visible. This basic principle has been utilized in the printing and game arts effectively to provide various forms of teaching, testing and game responding arrangements. A student or a player is given a marking pen and, based upon knowledge of certain information, selects an outlined area for marking corresponding to an answer which the student or player believes is correct to a question relating to such certain information which has been posed either in writing or orally. It also is known in more recent games such as Trivial Pursuit to provide visibly presented trivia questions to a player in a number of categories with the players travelling on a game board in accordance with the questions answered in the selected categories. These games have been comparatively complex to manufacture and expensive to play, requiring several parts including a game board, numerous cards, player tokens and player pieces.

The present invention, recognizing the limitations of the prior art, teaches a novel and useful way of utilizing the basic principle of scribing invisible ink upon a writing surface and marking the same in such a manner as to provide not only a challenging game of chance but one of intelligence, as well, which can provide to one or more players many hours of either "By Yourself Enjoyment" (trademark of Stry-Lenkoff Company) or group pleasure. Furthermore, the unique game of the present invention can be manufactured, packaged and marketed in a comparatively simple and straightforward manner, requiring a minimum of time, material and parts.

Various other features of the present invention will become obvious to one skilled in the art upon reading the disclosure set forth hereinafter.

SUMMARY OF THE INVENTION

More particularly the present invention provides a quiz game device including a first defined area with a number of questions and associated identifying indicia visibly set forth thereon, each question having at least two visibly marked answers with invisibly marked designations adjacent thereto to indicate correctness of the answer of the question responded to by a player when marked visible; and a second defined area having random chance selection means to indicate the question to be responded to by a player. In addition, the present invention provides a novel device for random chance selection for a quiz game including randomly marked invisible identifying indicia which, when marked visible, serve to indicate the identifying indicia of the question to be answered by a player. Further, the present invention provides a novel system and scoring arrangement for a quiz game to facilitate an equal number of tries by 2, 3, 4 or more players.

It is to be understood that various changes may be made by one skilled in the art in the arrangement, form and construction of the game described herein without departing from the scope or spirit of the present invention. For example, the random chance selection of questions to be answered by a player instead of being accomplished through randomly marked invisible identifying indicia can be accomplished by rolling a visibly marked die or dies or by spinning an arrow on a board having visibly marked indicia peripherally surrounding the area. Further, the identifying indicia for the questions can be either numerical, alphabetical, alphanumerical or pictorially illustrative.

BRIEF DESCRIPTION OF THE DRAWINGS

Referring to the drawings which disclose one advantageous embodiment of the present invention.

FIG. 1 is a plan view of a marking sheet incorporating a visible grid to provide defined areas which include appropriate invisible ink markings, the markings serving as identifying indicia for a game question to be answered;

FIG. 2 is a plan view of a marking sheet incorporating a list of visible questions, each having an identifying indicia visibly associated therewith to identify the question to be answered and a set of visibly marked answers with an invisibly marked designation adjacent thereto to indicate correctness of the answer selected;

FIG. 3 is a plan view of a marking sheet incorporating visibly marked grids thereon to permit recording and tallying of scores; and, FIG. 4 is a view of a color changing chemical marking means in the form of a pen and a cap for the tip thereof.

Referring to FIG. 2 of the drawings a list of visible questions to be answered by the player or players of the game, broadly indicated by reference numeral 2, is disclosed. These questions can relate to general information or information of a specific nature or category such as sports, history, geography, famous actors, historical characters or the like. Advantageously, twenty-four questions are visibly set forth in each game to facilitate an equal number of tries in the event more than one player should be involved—for example, two, three, four, six or even twelve or as many as twenty-four players as might occur in a party game. Each question has a visibly marked differing identifying indicia associated therewith to identify the specific question to be answered by a player. As is shown, arabic numerals, 1 through 24, broadly indicated by reference numeral 3, can be utilized but, if desired, a series of differing illustrations which can be compatible with the text of the question can also be used.

Set forth below each question is a set of visibly marked answers, broadly indicated by reference numeral 4. Each answer, has an invisibly marked designation adjacent thereto, broadly indicated by reference numeral 6.

The designation serves to indicate the correctness of the answer selected and responded to by a player. As disclosed, four visible answers are provided with each visible questions and the four invisibly marked designations include three incorrect "No" answers and one correct "Yes" answer. It is to be understood that other numbers of answers could be utilized as well as other symbols to designate correctness without departing from the scope or spirit of the present invention.

To select the question to be answered by a player, a visible grid 7 disclosed in FIG. 1 of the drawing is provided. Advantageously, grid 7 is provided with twenty-six segments therein, twenty-four of these segments each have invisibly and randomly marked identifying indicia there within which, when marked visible by a player, serve to correspond with and indicate the differing identifying indicia of the question, as disclosed in FIG. 2, to be answered by a player, upon its turn. As disclosed in FIG. 2, the identifying indicia are in the form of arabic numerals "1" through "24", broadly indicated by reference numeral 3. But, as above noted, differing illustrations which can be of a design compatible with the question can also be used in FIGS. 1 and 2. It is to be further noted in grid 7 of FIG. 1, that two of the twenty-six segments are provided with invisibly and randomly marked bonus indicia therewithin which when marked visible by a player serve to give such player a preselected bonus. In the embodiment disclosed, the bonus indicia is in the form of a star, reference numeral 8, but other indicia symbols such as a smiling face or an alphabetic "B" could be used.

Referring to FIG. 3 of the drawing, a third area is provided on a marking sheet to serve as a scoring area. As disclosed, the scoring area of FIG. 3 includes two visibly marked grids, 9 and 11, each with twenty-four segments to accommodate for a game played by two players and two visibly marked grids 12 and 13, each with 12 segments to accommodate for a game played by three or four players to permit recording and tallying of scores. Advantageously, the segments of the grids, 9, 11, 12 and 13, can be so chemically treated that when written upon with the color changing chemical marking pen 14 as disclosed in FIG. 4, a player's proper score can be recorded in writing with the score as written by pen 14 appearing. A suitable cap 16 is provided with pen 14 to preserve the pen wick when not in use.

It is to be understood that any one of several known chemical formulations for invisible printing ink can be employed in the present invention. For example, the marking sheets can be treated with a suitable acid or base material which remains substantially invisible and the pen 14 can be provided with appropriate color changing chemical materials. The acid or base is conveniently applied in any one of several aqueous solutions. The particular invisible ink formulation used on the marking sheets and writing instrument does not comprise an essential part of the present invention and the present invention is not to be considered as limited to any specific formulation. It is only essential that the figures in the defined areas remain suitably invisible until marked by a player with an appropriate marking instrument and formulations such as those described in the since expired U.S. Pat. No. 1,884,197 to H. J. Peterson, U.S. Pat. No. 2,618,866 to C. S. Adams and U.S. Pat. No. 3,363,336 to B. F. Skinner.

In playing the game described above, when a player's turn arises in an agreed upon preselected rotation—such as clockwise—the player, using pen 14 selects a segment in grid 7 to be marked. The invisible symbol when marked indicates the question drawn and to be answered by the player for its turn. So that the other players might be fully aware of the question and answer selected, the player upon its turn reads aloud both the question, the answer and the correctness thereof when marked with pen 14. If a "star" (*) appears, instead of a number, such player earns a four (4) point bonus and is then entitled to take another turn.

As disclosed in FIG. 2 of the drawing, the correct answer to the question drawn is one of four multiple choices. The player must continue to answer the drawn question until a "Yes" answer is obtained. A "Yes" answer on the first try earns four (4) points. An unsuccessful player is penalized and loses two (2) points, if two (2) tries are required, three (3) points for taking three (3) tries, and four (4) points if the correct "Yes" answer is not found until the last try. A suitable point schedule included with the games reads:

| "Tries" | Points" |
| --- | --- |
| 1 | +4 |
| 2 | −2 |
| 3 | −3 |
| 4 | −4 |

In playing the game, it is possible to obtain a score below zero as a consequence of the minus (−) points. Further, in playing the game, a player can double its score, if certain of the answer, by calling out "Double" before marking. If correct, the player earns double points but if incorrect the player receives a double penalty if two (2) to four (4) tries are required to reach a "Yes" answer.

A player, after seeing the question drawn, may choose to "PASS" to avoid a penalty by so declaring. A player must decide to "PLAY or PASS" (trademark of Stry-Lenkoff Company) before its first try. A "PASS" results in a loss of turn. To "PASS" results in passing the question to the next player in turn, who must draw a question and may choose to "DOUBLE". That player then selects another question, as well, for its regular turn.

The game is over when all blocks in the NUMBER CHART (FIG. 1) have been marked visible. The score at each turn is recorded with pen 14 on the grids 9, 11, 12 and 13, as the case might be. When a game is completed the total of each player is determined. In tabulating the score, all plus points are added and all minus points substracted. The total for a player may be a minus number. The player with the highest score wins the game.

The invention claimed is:

1. A quiz game device including a first defined area with a number of questions and associated specific identifying indicia visibly set forth thereon, each question having at least two visibly marked selectable answers with chemically treated invisibly marked designations adjacent thereto to indicate correctness of the answer selected and responded to by a player when marked visible; a chemically treated marking means to mark said answers visible, and a second defined area having random chance selection means in the form of a number of randomly marked invisible identifying indicia which, when marked visible with said marking means, serve to expressly designate specifically the correspondingly specific visible identifying indicia of the question to be responded to by a player.

2. The quiz game of claim 1, and a third area which is so chemically treated that, when written upon with said marking means, a score as so expressly written appears.

3. A quiz game comprising: at least one sheet having a first area with a number of questions visibly set forth thereon, each question having a specific identifying indicia visibly associated therewith to identify the specific question to be answered by a player and a set of at least two visibly marked selectable answers, each having an invisibly marked designation adjacent thereto designed to indicate the correctness of the answer selected and responded to by a player; a second area associated with said sheet having a visibly marked grid thereon to define a number of invisibly randomly marked identifying indicia within the segments of the grid which, when marked visible by a player, serve to correspond with and expressly designate specifically the correspondingly specific visible identifying indicia of the question to be answered by a player in the first area; color changing chemical marking means for marking segments within the visible grid of said second area so that a player, upon its turn, can identify the question to be answered in the first area and subsequently upon choosing, mark the designation adjacent the answer selected to determine the correctness of the answer selected and responded to by such player.

4. The quiz game of claim 3, the specific question identifying indicia comprising a series of differing numbers.

5. The quiz game of claim 3, the specific question identifying indicia comprising a series of differing illustrations compatible with the text of the question.

6. The quiz game of claim 3, wherein an assigned number of plus points are given to a player for each correct answer and an assigned number of minus points are given to a player for each incorrect answer with each player's total points being accumulated when all questions on the sheet have been answered.

7. The quiz game of claim 3, wherein an assigned number of plus points are given to a player for each correct answer and an assigned number of minus points are given to a player for each incorrect answer, each player having the option to not answer the question selected by it from marking the grid in said second area with the next successive player being required to answer such non-answered question and having the option to double its score before answering.

8. The quiz game of claim 3, said visibly marked grid in said second area further including at least one invisibly marked "bonus" indicia within one of the segments of said grid which when marked visible by a player serves to give such player a preselected bonus.

9. The quiz game of claim 3, said first area having 24 questions visibly set forth thereon to facilitate an equal number of tries by 2, 3, 4 or more players.

10. The quiz game of claim 3, each question having a set of 4 visibly marked answers with each having an invisibly marked designation adjacent thereto designed to indicate the correctness of the answer selected and responded to, the first try by a player, if correct, being given an assigned score of plus 4 points, a second try, if correct, an assigned score of minus 2 points, a third try, if correct, an assigned score of minus 3 points and a fourth try, if necessary, an assigned score of minus 4 points.

11. The quiz game of claim 3 and a third area associated with said sheet having a visibly marked grid thereon segmented in accordance with the number of questions and players to permit the recording and tallying of scores.

12. The quiz game of claim 11, said third area being so chemically treated that, when written upon with said color changing chemically marking means, the score as so expressly written appears.

13. A quiz game comprising: at least one sheet having a first area with 24 questions visibly set forth thereon to facilitate an equal number of tries by 2, 3, 4, 6, 12 or 24 players, each question having a specific identifying indicia visibly associated therewith to identify the specific question to be answered by a player, each question further having a set of 4 visibly marked selectable answers with each answer having an invisibly marked designation adjacent thereto designed to indicate the correctness of the answer selected and responded to, the first try by a player, if correct, being given an assigned score of plus four (4) points, a second try, if correct, an assigned score of minus two ($-2$) points, a third try, if correct, an assigned score of minus three ($-3$) points and a fourth try, if necessary, an assigned score of minus four ($-4$) points; a second area associated with said sheet having a visibly marked grid thereon with 26 segments therein, 24 of which segments each have invisibly and randomly marked identifying indicia therewithin which, when marked visible by a player, serve to correspond with and expressly designate specifically the correspondingly specific identifying indicia of the question to be answered by a player, upon its turn, in the first area and 2 of which segments have invisibly and randomly marked bonus indicia therewithin which, when marked visible by a player, serve to give such player a preselected bonus; each player having the option to "PASS" on the question drawn to the next player who must answer the drawn question with the player so declaring "PASS" losing its turn; and, a third area associated with said sheet serving as a scoring area having two visibly marked grids thereon each with 24 segments to accommodate for a game played by two players and two visibly marked grids thereon, each with 12 segments to accommodate for a game played by 3 or 4 players to permit recording and tallying of scores; said third area being so chemically treated that, when written upon with said color changing chemically marking means, the score as so expressly written appears.

* * * * *